United States Patent
Kannan et al.

(10) Patent No.: US 8,745,196 B2
(45) Date of Patent: *Jun. 3, 2014

(54) ENABLING CO-EXISTENCE OF HOSTS OR VIRTUAL MACHINES WITH IDENTICAL ADDRESSES

(75) Inventors: Kalapriya Kannan, Karnataka (IN); Shivkumar Kalyanaraman, Bangalore (IN); Vijay Mann, Haryana (IN); Anilkumar Vishnoi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,369

(22) Filed: Aug. 14, 2012

(65) Prior Publication Data
US 2013/0145008 A1 Jun. 6, 2013

Related U.S. Application Data

(63) Continuation of application No. 13/308,912, filed on Dec. 1, 2011.

(51) Int. Cl.
*G06F 15/173* (2006.01)

(52) U.S. Cl.
USPC ........... 709/223; 709/220; 709/221; 709/222; 709/224; 709/225; 709/226; 709/227; 709/228; 709/229; 709/238; 709/239; 709/240; 709/241; 709/242; 709/243; 709/244

(58) Field of Classification Search
USPC ................................. 709/220–229, 238–244
See application file for complete search history.

(56) References Cited

U.S. PATENT DOCUMENTS

| | | | |
|---|---|---|---|
| 6,681,258 | B1 | 1/2004 | Ratcliff et al. |
| 6,888,837 | B1 | 5/2005 | Cunningham et al. |
| 7,480,710 | B1 | 1/2009 | Olson et al. |
| 7,881,208 | B1 | 2/2011 | Nosella et al. |

(Continued)

FOREIGN PATENT DOCUMENTS

| | | |
|---|---|---|
| EP | 1732265 A1 | 12/2006 |
| WO | 2010121377 A1 | 10/2010 |

OTHER PUBLICATIONS

Mysore et al., "Portland: A Scalable Fault-Tolerant Layer 2 Data Center Network Fabric." Proceeding SIGCOMM '09 Proceedings of the ACM SIGCOMM 2009 conference on Data Communication, pp. 1-12.

(Continued)

*Primary Examiner* — Wing F Chan
*Assistant Examiner* — Padma Mundur
(74) *Attorney, Agent, or Firm* — Ryan, Mason & Lewis, LLP

(57) ABSTRACT

A method for enabling co-existence of multiple machines with identical addresses within a single data center network. The method includes assigning a unique pseudo identifier to each machine in the network that can be used for routing a packet to a destination machine, replacing a sender media access control address on an address resolution protocol request with a pseudo identifier of the sender at an edge network switch, retrieving a private network identifier from a mapping table based on the sender pseudo identifier and returning a pseudo identifier for the destination address based on the private network identifier, and replacing the pseudo identifier of the destination address with an actual identifier at a destination edge network switch for routing the packet to the destination machine.

14 Claims, 7 Drawing Sheets

(56) References Cited

U.S. PATENT DOCUMENTS

| | | | |
|---|---|---|---|
| 2002/0087721 | A1 | 7/2002 | Sato et al. |
| 2005/0207447 | A1 | 9/2005 | Sekiguchi et al. |
| 2010/0290422 | A1 | 11/2010 | Haigh et al. |
| 2010/0306408 | A1 | 12/2010 | Greenberg et al. |
| 2011/0090911 | A1* | 4/2011 | Hao et al. .................. 370/395.53 |
| 2011/0119748 | A1 | 5/2011 | Edwards et al. |
| 2013/0058251 | A1* | 3/2013 | Koponen et al. .............. 370/254 |

OTHER PUBLICATIONS

Sethi et al., "Rapid Development of SOA Solutions via Autmated Image Republican and Reconfigurations" IEEE SCC, 2008, pp. 155-162.

"VMware Vnetwork distributed switch." [Online]. Available: https://www/vmware.com/products/vnetwork-distributed-switch/overview.html, downloaded Dec. 28, 2011, pp. 1-2.

"Cisco Nexus 1000V series Switches." [Online]. Available http://www.cisco.com/en/US/prod/collateral/switches/ps9441/ps9902/data_sheet c78-492971.html, 2011, pp. 1-18.

Jiang et al., "Violin: Virtual Internetworking on Overlay Infrastructure," in International Symposium on Parallel and Distributed Processing and Applications (ISPA), 2005, pp. 1-10.

McKeon et al., "OpenFlow: Enabling Innovation in Campus Networks," ACM SIGCOMM Computer Communication Review, vol. 38, No. 2, Apr. 2008, pp. 1-6.

"Mininet: Rapid Prototyping for software defined networks." [Online]. Available: http://yuba/stanford/edu/foswiki/bin/view//OpenFlow/Mininet, downloaded Dec. 28, 2011, pp. 1.

"RFC 5227—IPv4 Address Conflict Detection." [Online]. Available: "http//tools.ietf.org/html/rfc5227" Jul. 2008, Apple Inc. pp. 1-21.

Greenberg et al., "VL2: A Scalable and Flexible Data Center Network," ACM SIGCOMM, Aug. 2009, pp. 51-62.

"Detection of Duplicate IP addresses by Microsoft TCP/IP." [Online]. Available: http://support.microsoft.com/kb/120599, downloaded Dec. 28, 2011, pp. 1-2.

Gude et al., "NOX: Towards an Operating System for Networks" ACM SIGCOMM Computer Communication Review, Jul. 2008, pp. 1-6.

Chen et al., "Generic and Automatic Address Configuration for Data Center Networks," ACM SIGCOMM, Aug. 2010, pp. 39-50.

"Open vSwitch—An Open Virtual Switch." [Online]. Available: http://www.openvswitch.org, downloaded Dec. 28, 2011, pp. 1.

"ARPing command." [Online] Available: http://linux.about.com.library/cmd/blcmd18 arping.htm, downloaded Feb. 13, 2012, pp. 1-2.

"Iperf Bandwidth Measurement Tool." [Online]. Available: http://sourceforge.net/projects/iperf, downloaded Dec. 28, 2011, pp. 1-2.

"Httperf Web Server Performance Tool." [Online]. Available: http://sourceforge.net/projects/httperf/, downloaded Dec. 28, 2011, pp. 1-2.

"Overlay Network." Wikipedia, http://en.wikipedia.org/wiki/Overlay_network, downloaded Feb. 13, 2012, pp. 1-3.

Mysore et al. Portland: A Scalable Fault-Tolerant Layer 2 Data Center Network Fabric, Proceedings of the ACM SIGCOMM conference on Data Communication, 2009, pp. 39-50.

* cited by examiner

FIG. 2

```
# reads a configuration file mac_to_pmac that has the format
# <Switch ID, AMAC, PMAC, Output Port, IP, PNID> and populates
# the controller mapping table and ip table
def create_controller_tables():
    f = open('./mac_to_pmac', 'r+')
    mapping_table={}
    ip_table={}
    for line in f:
        fields = line.split(',' ,)
        switchid = fields[0]
        amac = fields[1] .rstrip('\n')
        pmac = fields[2] .rstrip('\n')
        outport = int(fields[3] .rstrip('\n'))
        ip = fields[4] .rstrip('\n') ;
        pnid = int(fields[5] .rstrip('\n'))
        # populating the controller mapping table which is
# hashed on pmac
        mapping_table[pmac] = [amac, ip, pnid, switchid, outport]
        # ip table is a table hashed on IPs and stores
        # pmac and pnid for duplicate IPs as a list
        if (ip in ip_table):
            ip_table[ip].append([pmac, pnid])
        else:
            ip_table[ip] = [ [pmac, pnid] ]
    f.close()
```

FIG. 3

```
# reads a configuration file arp.cfg that has the format
# <Switch ID, Port Number, PMAC>
# and installs rules in the switch for
# replacing ethernet source address with source PMAC
# in ARP requests and redirecting them to controller
def install_flows_arpredirection(dpid) :
    f=open('./arp.cfg' , 'r')
    val=str(dpid)
    for line in f:
    fields = line.split(',' ,)
    if (fields[0] == val ) :
        if(line):
            flow = {}
    #arp packets have EtherType 0x806
            flow[core.DL_TYPE] =0x0806
              token = line.split(',' ,)
            flow[core.IN_PORT] = int(token[1])
              pmac = token[2] .rstrip('\n')
            actions = [ [openflow.OFPAT_SET_DL_SRC, pmac],
                [openflow.OFPAT_OUTPUT,
         [1500, openflow.OFPP_CONTROLLER] ] ]
            inst.install_datapath_flow(dpid, flow, 0, 0, actions)
    f.close()
```

```
# installs rules in the switch for
# replacing PMAC in the ethernet destination address
# with AMAC and forwarding it to the correct output port
def install_flow_reversal_headerrewriting(dpid):
    for pmac, value in mapping_table.iteritems():
#switch id is at index 3, amac is at index 0,
#output port is at index 4 for each pmac
#in the controller mapping_table
if(value[3] == str (dpid)):
            flow={ }
            flow[core.DL_DST]=pmac
    #IP packets have ether type 0x800
            flow[core.DL_TYPE] =0x0800
    actions= [ [openflow.OFPAT_SET_DL_DST, value[0]],
[openflow.OFPAT_OUTPUT, [0, vaule[4] ] ] ]
            inst.install_datapath_flow(dpid, flow, 0, 0, actions)
```

```
def send_arp_reply(dip, reqpkt, inport) :
    reqh = reqpkt.find('arp')
    #mapping table is hashed using pmas and
    #pnid is at index 2 of the returned list
    #ip table is hashed using ip and each entry
    #is a list of (pmac, pnid)
    pnid=0
    if array_to_octstr(reqpkt.src) in mapping_table:
        pnid = mapping_table[array_to_octstr(reqpkt.src)] [2]
    else:
        print "src pmac not found = a new host"
        return
    for ip in ip_table[ip_to_str(reqh.protodst)] :
        if (pnid == ip[1]) :
        dest_pmac = ip[0]
    if (dest_pmac == None) :
        print "No matching dest_pmac found"
        return
    replyh=arp ()
    replyh.hwsrc = octstr_to_array(dest_pmac)
    replyh.hwdst = reqh.hwsrc
    replyh.hwlen = reqh.hwlen
    replyh.opcode = arp.REPLY
    replyh.protolen = reqh.protolen
    replyh.protosrc = reqh.protodst
    replyh.protodst = reqh.protosrc
    replypkt = ethernet ()
    replypkt.set_payload(replyh)
    replypkt.type = ethernet.ARP_TYPE
    #Identity controller's PMAC is set as the source
    #in ARP response
    replypkt.src = octstr_to_array("00:00:00:00:00:23")
    replypkt.dst = reqh.hwsrc
    inst.send_openflow_packet (dip, replypkt.tostring(), inport)
```

ENABLING CO-EXISTENCE OF HOSTS OR VIRTUAL MACHINES WITH IDENTICAL ADDRESSES

CROSS-REFERENCE TO RELATED APPLICATIONS

This application is a continuation of U.S. patent application Ser. No. 13/308,912, filed Dec. 1, 2011, incorporated by reference herein.

FIELD OF THE INVENTION

Embodiments of the invention generally relate to information technology (IT), and, more particularly, to virtual machine management.

BACKGROUND OF THE INVENTION

Enterprise computing is evolving at a rapid pace due to advances in the virtualization technology. A prominent change revolves around mobility of software resources. Entire software stacks in the form of virtual machines can now be moved, live (that is, without a down-time) or offline (backup and restore), anywhere within the same data center or from one data center to another with relative ease. This evolving landscape presents challenges such as the co-existence of identical or overlapping layer-2 and layer-3 addresses within a single data center network.

Enterprises can spend significant IT costs on configuration and deployment of large multi-tier applications. For example, multiple instances of such applications are required due to a variety of reasons. There can be multiple environments (such as production, staging or test, development, etc.) in an enterprise that need to host identical (or scaled down) instances of these applications. Also, as enterprises grow and new acquisitions are made in different geographical locations, multiple geographically distributed but interconnected data centers emerge that need to host identical applications.

For both scenarios, significant redeployment and reconfiguration costs could be saved if the same multi-tier application instance (comprising of several virtual machines) can be cloned or replicated. This practice is not wide-spread because the internet protocol (IP) address range for the original replicated instances might be completely different from the new network where these replicas are being restored. Additionally, these IP address ranges may be overlapping or identical. Due to this, typically IP addresses need to be reconfigured for the restored instances. This effort is non-trivial, as these IP addresses are embedded at various places (various operating systems (OS, middleware configuration files, etc.) in these virtual machines.

Additionally, data centers that are designed independently may have overlapping network address ranges, and may not be interconnected as part of a single network fabric. Also, a cloud provider must allow its customers to restore their backed up applications in the form of virtual machines (VMs) without any change onto its network. These various customer VMs may have IP addresses that clash with IP addresses of other customers' VMs or with the IP addresses used by the provider itself.

Consequently, a need exists for enabling co-existence of hosts or virtual machines with identical addresses.

SUMMARY OF THE INVENTION

In one aspect of the present invention, techniques for enabling co-existence of hosts or virtual machines with identical addresses are provided. An exemplary computer-implemented method for enabling co-existence of multiple machines with identical addresses within a single data center network can include steps of assigning a unique pseudo identifier to each machine in the network that can be used for routing a packet to a destination machine, replacing a sender media access control address on an address resolution protocol request with a pseudo identifier of the sender at an edge network switch, retrieving a private network identifier from a mapping table based on the sender pseudo identifier and returning a pseudo identifier for the destination address based on the private network identifier, and replacing the pseudo identifier of the destination address with an actual identifier at a destination edge network switch for routing the packet to the destination machine.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating code for creating mapping_table and ip_table at the network controller (also referred to as the identity controller), according to an embodiment of the present invention;

FIG. 3 is a diagram illustrating code for Rule 1 for redirecting address resolution protocol (ARP) requests, according to an embodiment of the invention;

FIG. 4 is a diagram illustrating code for Rule 2 for replacing pseudo media access control (PMAC) with actual media access control (AMAC) for incoming internet protocol (IP) packets, according to an embodiment of the present invention;

FIG. 5 is a diagram illustrating code for finding the destination PMAC from controller tables and responding to an address resolution protocol (ARP) request, according to an embodiment of the invention;

DETAILED DESCRIPTION OF EMBODIMENTS

As described herein, an aspect of the present invention includes a data center network fabric for enabling co-existence of hosts or virtual machines (VMs) with identical addresses (for example, layer 2 and layer 3 addresses). In typical data centers, layer 2 addresses correspond to media access control (MAC) addresses and layer 3 addresses correspond to Internet Protocol (IP) addresses. At least one embodiment of the invention includes using pseudo addresses to uniquely identify each host or VM and employing address resolution and duplicate detection techniques to enable co-existence of hosts and VMs with identical addresses. By way of example, a centralized programmable control plane (for example, as offered by OpenFlow) can be leveraged and design and implementation of the scheme can be presented in Mininet.

As detailed herein, an aspect of the invention includes supporting identical addresses through the use of address resolution protocols (ARPs) for unique host identification by replacing the source media access control (MAC) in an ARP request with a unique identifier (pseudo MAC (PMAC) or pseudo IP) that can be used for routing. An embodiment of the invention also includes the creation and maintenance of a mapping table at a network controller that maps pseudo identifiers with the private network identifiers (PNIDs) of which a particular host or VM is part. This helps create multiple private networks or overlays within a single network, and each private network includes machines or hosts with unique addresses. Additionally, an aspect of the invention includes using duplicate detection schemes to automatically assign private network identifiers and to detect duplicates within a private network.

Assigning a pseudo MAC address to each physical machine (PM) or VM can be carried out as follows. An open flow controller assigns a 48 bit PMAC to each PM or VM. PMAC to AMAC mappings are cached at the top-of-rack (TOR) for all hosts/VMs that reside under that TOR. Routing takes place based on PMACs, and destination top-of-rack (TOR)/vswitch replaces PMAC with AMAC before delivering the packet (header rewriting).

Figure 1:
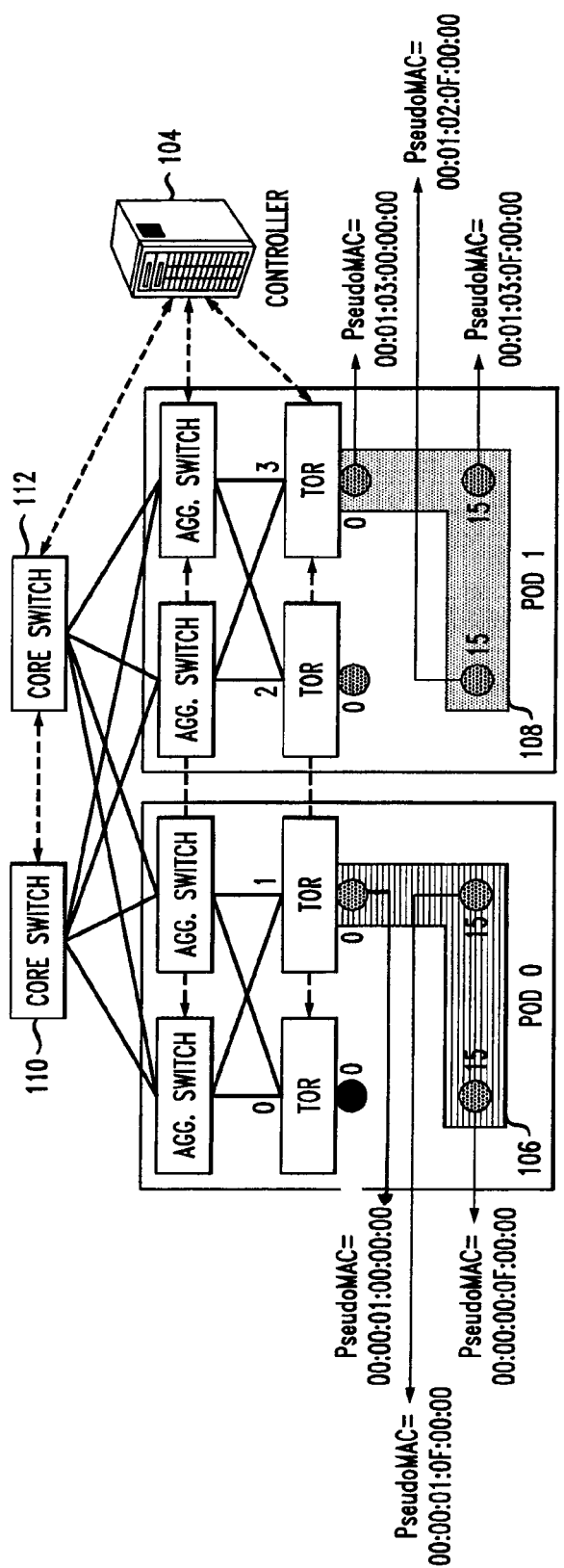
FIG. 1 is a block diagram illustrating an example embodiment, according to an aspect of the invention.

FIG. 1 is a block diagram illustrating an example embodiment, according to an aspect of the invention. By way of illustration, FIG. 1 depicts a controller mapping table 102, a controller 104, POD (0) 106, POD (1) 108, core switch 110 and core switch 112.

FIG. 1 depicts an overview of the architecture of at least aspect of the invention, which leverages a centralized programmable control plane (for example, as provided by OpenFlow). The architecture includes a network controller which is connected to all of the switches. The network controller forms the centralized control plane of the network and handles most decisions related to routing and forwarding of packets (the data plane). The network controllers have the ability to install rules on all switches according to which incoming packets can be modified or routed.

In an embodiment of the invention, an identity network controller can be implemented as a python application running on top of a NOX OpenFlow controller. NOX is an event driven controller and applications running on top thereof may register callbacks to get notified of various events. Identity network controller registers callback for three types of events:

arrival of a packet (packet in), a switch joining the network (datapath join), and a switch leaving the network (datapath leave).

At least one aspect of the invention also includes uniquely identifying a host or a VM. A pseudo MAC can be used to uniquely identify every host and VM in the network. An OpenFlow controller assigns a 48 bit Pseudo MAC (PMAC) to each host or virtual machine of the form:

pod.position.port.vmid where pod (16 bits) is a POD identifier where the TOR switch resides, position (8 bits) identifies the TOR switch's position within the POD, port (8 bits) is the port number on the TOR switch to which the physical host is directly connected, and vmid (16 bits) is the VM identifier on a particular host. This PMAC format embeds the hierarchical network topology within the pseudo identifier and is used for all routing.

The controller maintains a mapping of a VM's (or a host's) PMAC to its actual MAC address (AMAC), its IP address as well a private network identifier (PNID) to which a particular host or VM belongs. VMs or hosts within the same private network can communicate freely and an aspect of the invention ensures that there are no duplicate addresses within a private network.

External hosts (outside the data center across the Internet) can also communicate with hosts within this private network using a gateway service which has a publicly known unique IP address and is configured to communicate with a given private network. The gateway can be one of the hosts or VMs within the private network itself which is assigned a unique public IP in addition to its original address. By default, all hosts and VMs are provided with a PNID of 0, which represents the entire data center network. Subsequent hosts with duplicate addresses are assigned PNIDs in increasing order.

Additionally, at least one embodiment of the invention includes recording an application ID in addition to a PNID. Application IDs identify a set of VMs or physical machines (PMs) that are replicated (backed up and restored) together and represent a single multi-tier application. Also, an application ID can be used to identify VMs that can act as backups for other VMs in other replicated clusters that represent the same component of the multi-tier application and can be used for fail over. It can be assumed that the components are either state-less or that they are kept in sync after replication.

An aspect of the invention can also include addition of new hosts and address assignments. PMACs can be statically assigned at startup or the topology may be learnt using a protocol such as label distribution protocol (LDP). Because the overall network topology (governed by network switches and their interconnect) can change infrequently in enterprise data center networks, an embodiment of the invention includes using static assignment. A mapping of appropriate PMACs for each port for all switches is created based on the known network topology. The last 16 bits in the PMAC (representing the VM identifier) are statically assigned in increasing order to different VMs or hosts based on their known actual MAC addresses. The mapping between PMAC, AMAC, IP, PNID, switchID, and switch port number is statically defined and read by the identity network controller from a configuration file at startup. The python code for creating the controller tables is given in FIG. 2. Accordingly, FIG. 2 is a diagram illustrating code 202 for creating mapping_table and ip_table at the network controller (also referred to as the identity controller), according to an embodiment of the present invention.

As detailed herein, an aspect of the invention includes ARP resolution. Whenever a network switch joins the network, an identity network controller gets notified. The identity network controller, in turn, consults its mapping table to find the list of all hosts and VMs that are supposed to be connected to that switch. For each of those hosts and VMs, the identity network controller then generates and installs two rules on the switch:

- Rule 1: This rule redirects all ARP requests (including gratuitous ARP requests) that the switch gets on all of its input ports from the connected hosts or VMs to the controller. Because the PMACs for all ports of a switch are in the controller mapping table, the controller also specifies in the rule that the source ethernet (AMAC) address of the ARP packet must be replaced with the source PMAC. The python code for setting this rule is given in FIG. 3.
- Rule 2: This rule replaces the destination PMAC in an IP packet with the destination AMAC for all incoming packets, so that the destination AMAC can be accepted by the destination host or VM. The python code for setting this rule is given in FIG. 4.

FIG. 3 is a diagram illustrating code 302 for Rule 1 for redirecting address resolution protocol (ARP) requests, according to an embodiment of the invention. FIG. 4 is a diagram illustrating code 402 for Rule 2 for replacing PMAC with AMAC for incoming IP packets, according to an embodiment of the present invention.

In addition to Rule 1 and Rule 2 detailed above, several other rules that are required to route a packet based on PMACs can be installed on the switch. Once these rules are installed on the switches, every time an ARP broadcast request is generated from a host or a VM, the request is redirected to the controller by the switch after replacing the source AMAC in ethernet header with the source PMAC. Upon receiving an ARP request, the controller checks the PMAC of the source in the ethernet header. The controller then consults its mapping table, retrieves the PNID corresponding to the source PMAC from its mapping table, and chooses the destination PMAC based on a combination of the destination IP address and the source PNID. This resolves the issue of identifying the correct destination in presence of duplicate IP addresses. The controller then creates an ARP response with the correct destination PMAC. The code snippet for these steps is shown in FIG. 5. Accordingly, FIG. 5 is a diagram illustrating code 502 for finding the destination PMAC from controller tables and responding to an ARP request, according to an embodiment of the invention.

Illustrative Example

In Connection with Table I—Mapping Table at the Controller

TABLE I

| VM | PMAC | AMAC | IP | PNID | Switch ID | Port |
|----|------|------|----|----|-----------|------|
| VM1 | PMAC-1 | AMAC-1 | IP-1 | 0 | 2 | 1 |
| VM2 | PMAC-2 | AMAC-2 | IP-2 | 0 | 2 | 2 |
| VM3 | PMAC-3 | AMAC-3 | IP-3 | 0 | 2 | 3 |
| VM1' | PMAC-4 | AMAC-1 | IP-1 | 1 | 5 | 1 |
| VM2' | PMAC-5 | AMAC-2 | IP-2 | 1 | 5 | 2 |
| VM3' | PMAC-6 | AMAC-3 | IP-3 | 1 | 5 | 3 |

For the purpose of illustration, consider an example where there are three VMs (VM1, VM2 and VM3) in the network, each with their own unique IPs (IP-1, IP-2 and IP-3), unique PMACs (PMAC-1, PMAC-2, PMAC-3) and AMACs (AMAC-1, AMAC-2, AMAC-3), respectively. Also assume that these three VMs are connected to a switch with ID=2 and on port numbers 1, 2 and 3, respectively. These VMs will be given a default PNID of 0. These VMs may be running a typical three tier application with a web tier, an application tier, and database (DB) tier.

Assume that each of these VMs is copied to create another instance of this multi-tier application. These three replicated VMS (VM1', VM2' and VM3') will have the same IP and MAC addresses as the original three VMs. However, they will have their own unique PMACs (PMAC-4, PMAC-5, PMAC-6). Additionally, assume that these three replicated VMs are connected to a switch with ID=5, and on port numbers 1, 2 and 3, respectively. The controller would have assigned a PNID of 1 to these replicated VMs. At this point, the mapping table at the controller will be as shown in table I (column 1 with VM names has been added only for the purpose of illustration). The first three lines represent the entries for the original three VMs whereas the last three lines represent the entries for the replicated VMs.

When VM1' attempts to send a packet to VM2' for the first time, an ARP request (of the form "who has IP-2") is generated and goes to switch with ID=5. The switch redirects the ARP request to the controller after replacing the source address in the ethernet header (AMAC-1) with the source PMAC (PMAC-4) (according to Rule 1 above). The controller receives the ARP request and checks the source address in the ethernet header. Because the source address is PMAC-4, the controller consults the mapping table and detects that the PNID is 1. The controller scans its mapping table to find out the PMAC address corresponding to IP-2 and PNID=1. Because PMAC-5 is the PMAC matching IP-2 and PNID=1, the controller responds with an ARP response specifying the destination address in the ARP payload as PMAC-5. VM1' then creates a packet with destination ethernet address as PMAC-5. The routing rules take care of ensuring that packet reaches the correct switch (with SwitchID=5). Switch 5 receives the packet and replaces the destination ethernet address back to AMAC-1 (according to Rule 2 above) and outputs it to the correct port (port 2).

The hosts or VMs that have identical AMACs cannot be connected to the same edge or TOR switch (because the TOR switch outputs based on AMAC). This is not a problem for VMs that only have a duplicate IP address but a unique AMAC. Further, an embodiment of the invention can include using an OpenFlow enabled vswitch in the hypervisor and installing all OpenFlow rules in the vswitch instead of the TOR switch. This will move this restriction to the hypervisor or host level (there are no VMs with duplicate AMACs on a host). However, this technique cannot be used for non-virtualized hosts and will require the hosts to have support for an OpenFlow enabled vswitch.

As also detailed herein, an aspect of the invention include gratuitous ARP handling. A gratuitous ARP is an ARP announcement sent by the operating system on a host at boot time containing the IP and MAC address of the sender and used to update other hosts' mapping of a hardware address when the sender's IP address of MAC address has changed. An identity network controller handles gratuitous ARPs for reasons such as the following. For example, the controller needs to ensure that a gratuitous ARP is not sent as a broadcast to all hosts, because it will generate many ARP responses because of existence of duplicate IP addresses. Identity network fabric should broadcast the gratuitous ARP only to hosts that reside within the same private network so that the hosts can update their ARP-cache. This ensures that all hosts within a private network do not have any stale ARP entries. It also helps in detecting any duplicate IP addresses within a private network.

Additionally, a gratuitous ARP can also be used for detecting duplicate IP addresses when such addresses appear for the first time in the network, assigning PMACs and assigning private network identifiers automatically.

Gratuitous ARPs (like all ARPs) are redirected to an identity network controller (according to Rule 1) with the source AMAC replaced with source PMAC in the ethernet packet header. The identity network controller detects a gratuitous ARP as follows. An ARP packet is detected as a gratuitous ARP if:

the ARP packet is a request, with the source IP address the same as the destination IP address, and the destination MAC is set to 0.

the ARP packet is a reply, with both the source IP address and MAC address the same as the destination IP address and MAC address.

Note that for both the cases, the ethernet packet is a broadcast (that is, ethernet destination address is ff:ff:ff:ff:ff:ff).

After identifying an ARP packet to be a gratuitous ARP, the controller determines the private network to which the host or VM sending the gratuitous APR belongs. This can be detected using the source PMAC in the ethernet header of gratuitous ARP packet and consulting the mapping table.

The identity network controller creates a set of unicast gratuitous ARP messages for all of the hosts or VMs that share the same private network (PNID). While creating these gratuitous APR messages, the controller can use multiple rules. For example, the controller can use the source PMAC in the ethernet packet for a source address and the destination PMAC in the ethernet packet for a destination address so that the packet can be routed using PMACs.

Also, the controller uses the source PMAC as the source MAC address in the ARP packet (payload of ethernet packet), sets the destination MAC to 0, and uses the source IP for both the source and destination IP address. This helps in ensuring that the receiving hosts will detect the message as a gratuitous ARP message and will update their ARP-cache with the corresponding source PMAC and its IP. If the IP is a duplicate within the private network, the receiving hosts can respond with an ARP response to the sender (the one who originally send the gratuitous ARP), thereby reporting the conflict.

An aspect of the invention can additionally include automated duplicate detection and PNID assignment. As described herein, the identity controller installs a rule Rule 1' on all edge switches (TORs) that redirect all ARPs requests to the controller (without replacing the source MAC with source PMAC (as described in Rule 1 herein). A flow diagram explaining the technique is given in FIG. 6.

Figure 6:
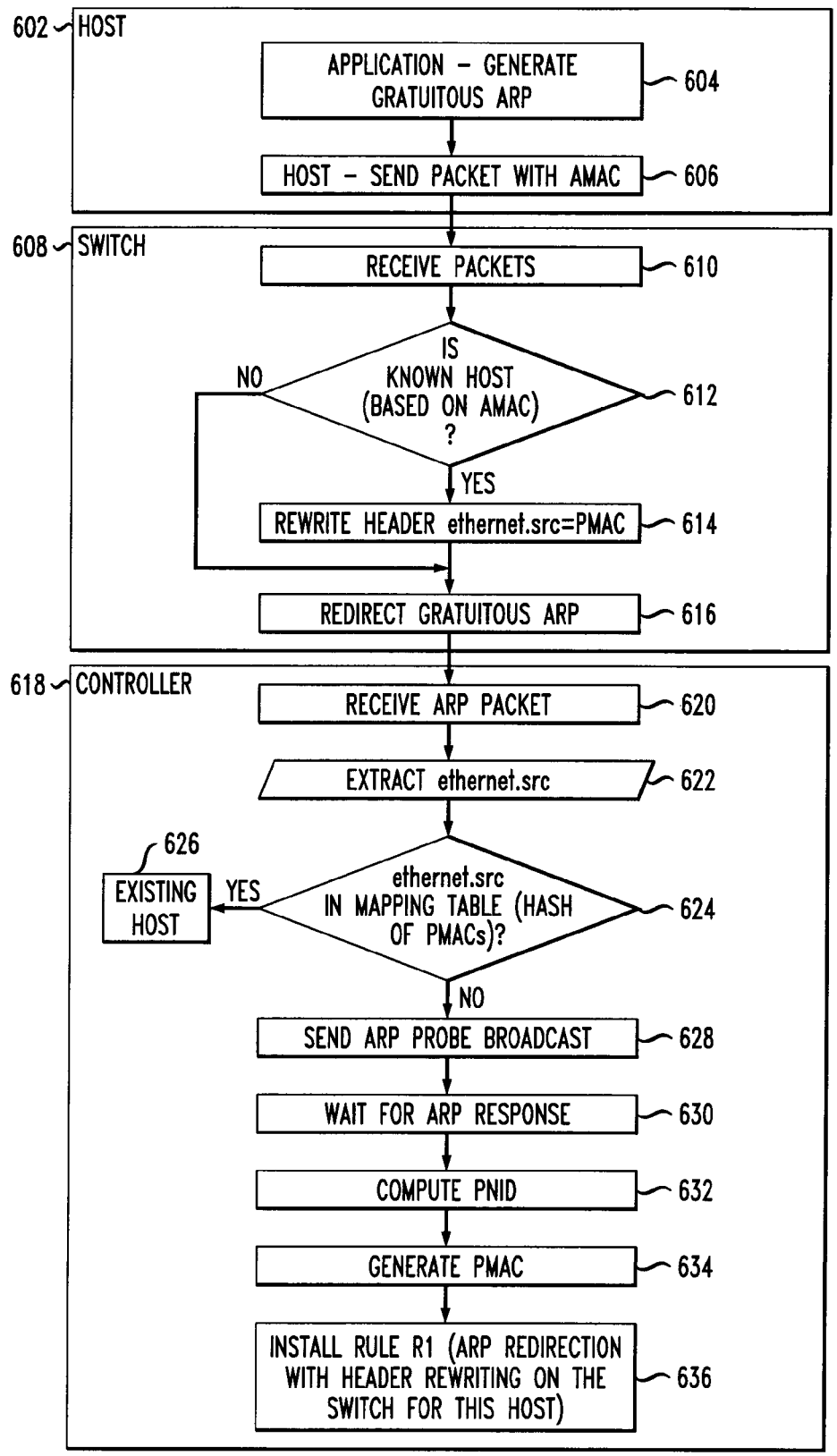
FIG. 6 is a flow diagram illustrating automatic private network identifier (PNID) assignment and duplicate detection, according to an embodiment of the present invention.

FIG. 6 is a flow diagram illustrating automatic PNID assignment and duplicate detection, according to an embodiment of the present invention. By way of illustration, FIG. 6 depicts a host component 602, a switch component 608 and a controller module 618. Performed in connection with host component 602, an application generates a gratuitous ARP in step 604 and the host sends a packet with AMAC in step 606.

Performed in connection with switch components 608, step 610 includes receiving packets and step 612 includes determining if the host is known based on the AMAC. If yes (that is, the host is known), step 614 includes rewriting the header and replacing the source MAC address with the PMAC (ether.src=PMAC). If no (that is, the host is not known), the header is not changed. In both cases, step 616 includes redirecting the gratuitous ARP to the network controller.

Additionally, the controller module 618 receives the ARP packet in step 620. Step 622 includes extracting source MAC address (ethernet.src) from the ARP packet header. Step 624 includes determining if the source MAC address is in a mapping table (that is, indexed by PMACs). If yes, the host is identified as an existing host in step 626 because the MAC address in the packet header matches an existing PMAC (which must have been previously assigned and the switch must have replaced source MAC with PMAC in step 614). If no, step 628 includes sending an ARP probe broadcast. Further, step 630 includes waiting for an ARP response. Step 632 includes computing a private network identifier (PNID) and step 634 includes generating a PMAC. Additionally, step 636 includes installing Rule 1 (as described herein); that is, an ARP redirection with header rewriting on the switch for this host.

As detailed in FIG. 6, as new hosts or VMs are added to the network, the hosts/VMs send a gratuitous ARP at boot time (this can also be done manually if the VM is being restored from a checkpointed state). The gratuitous ARP is a broadcast message and gets redirected to the controller because of the preinstalled rule Rule 1'. For new hosts, Rule 1' will be used to forward all ARP requests to the controller without replacing source MAC address in the header. Rule 1 will be used later for old hosts (after they have been assigned a PMAC) and it will include replacing the source MAC address with PMAC. The description here relates to new hosts (and Rule 1' should be applied). The controller, upon receiving a gratuitous ARP, retrieves the source address from the ethernet header (which is an AMAC) and checks its mapping table (which is hashed using PMACs) as given in FIG. 5. For new hosts, the AMAC will not be found in the mapping table and, at this point, the controller will send a broadcast ARP probe to all hosts specifying the IP address and the AMAC address of the sender who generated the gratuitous ARP.

The controller waits for a predetermined time interval (for example, two minutes) for any responses. If no ARP responses are received, the controller assumes that there are no duplicates, and it assigns a private network identifier (PNID) 0 to the new host. However, if one or more ARP responses are received, the controller retrieves the source Ethernet address (which should have been replaced with the source PMAC as per Rule 1) from all of the responses and detects the PNIDs corresponding to all of the PMACs. The controller then generates a unique PNID (in monotonically increasing fashion) for the new host.

Having determined the PNID for a new host, the controller assigns the appropriate PMAC based on the switch ID, and input port number of the switch where the gratuitous ARP was generated. The controller also adds this new entry to its mapping table with the PMAC, AMAC, PNID, Switch ID and Port information.

Using this time order, hosts or VMs that comprise one backed-up/restored application can be added one by one to the network and they will all be assigned the same PNID (assuming that all of them either have a duplicate IP or a unique IP).

Once the controller adds a new entry to its mapping table (either for a new IP address or a duplicate one), it installs Rule 1 on the switch for the new host. This rule will redirect all future ARP requests from this host to the controller after appropriate header rewriting (source AMAC is replaced with source PMAC). If the number of rules on a switch is not a concern, then this rule can be installed on all edge switches. This will help in cases when an existing host or VM is disconnected from one switch and moved to a different switch in the same network. Because the rule will replace AMAC with PMAC in the ethernet header of gratuitous ARP, the controller will be able to find the PMAC in its mapping table and will not perform duplicate detection.

Figure 7:
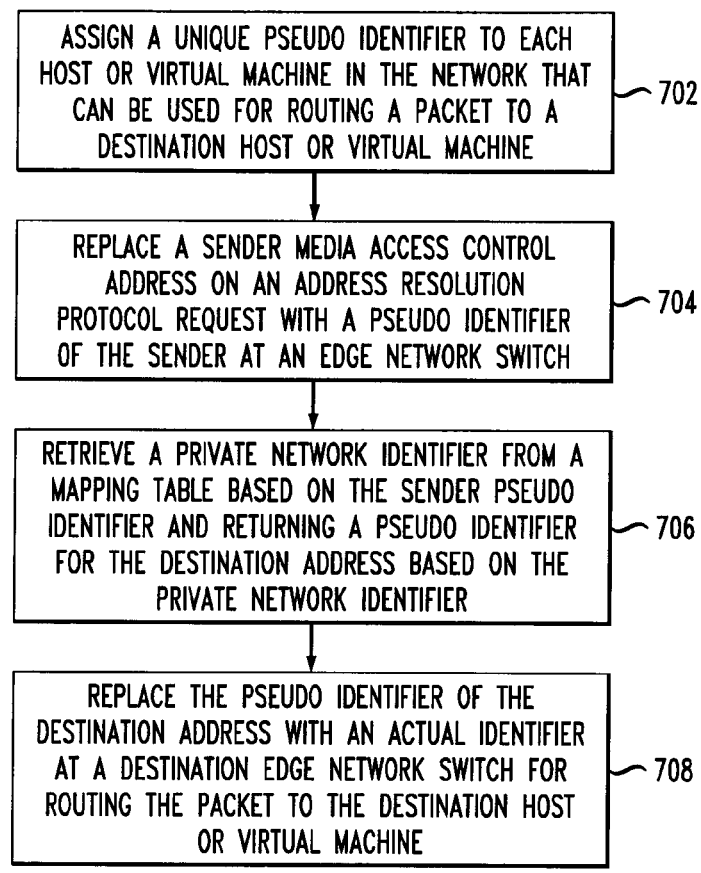
FIG. 7 is a flow diagram illustrating techniques for enabling co-existence of multiple machines with identical addresses within a single data center network, according to an embodiment of the invention.

FIG. 7 is a flow diagram illustrating techniques for enabling co-existence of multiple machines (for example, multiple hosts and/or multiple virtual machines) with identical addresses within a single data center network, according to an embodiment of the present invention. Step 702 includes assigning a unique pseudo identifier to each machine (for example, host or virtual machine) in the network that can be used for routing a packet to a destination (host or virtual) machine.

Step 704 includes replacing a sender media access control address on an address resolution protocol request with a pseudo identifier of the sender at an edge network switch and redirecting the request to a network controller. Replacing a sender media access control address on an address resolution protocol request with a pseudo identifier of the sender can include replacing the address via use of a top-of-rack (TOR) switch or via use of a virtual switch.

Step 706 includes retrieving a private network identifier from a mapping table at the controller based on the sender pseudo identifier and returning a pseudo identifier for the destination address based on the private network identifier. Retrieving a private network identifier from a mapping table based on the sender pseudo identifier can include retrieving the private network identifier via use of a network controller. Also, returning a pseudo identifier for the destination address can include returning a pseudo identifier for the destination address for which media access control address is being requested.

Step 708 includes replacing the pseudo identifier of the destination address with an actual identifier at a destination edge network switch for routing the packet to the destination machine. In at least one embodiment of the invention, routing is done based on pseudo identifiers. Additionally, replacing the pseudo identifier of the destination address with an actual identifier can include replacing the identifier via use of a destination top-of-rack (TOR) switch or via use of a virtual switch.

The techniques depicted in FIG. 7 can also include redirecting the address resolution protocol request to a network controller.

As also detailed herein, in at least one embodiment of the invention, assigning a unique pseudo identifier to each machine in the network can include assigning a unique pseudo identifier to each machine that embeds one of a data center identifier, a pod identifier, a switch identifier, a port number, a virtual machine identifier, a replication identifier and an application identifier. An aspect of the invention can further include determining a replica identifier from the sender pseudo identifier and returning a pseudo identifier for the destination address based on the replica identifier. Determining a replica identifier from the sender pseudo identifier can include determining the replica identifier via a controller, and returning a pseudo identifier for the destination address can include returning the pseudo identifier for the destination address for which media access control address is being requested. Further, an aspect of the invention can include using an application identifier in the pseudo identifier to match a similar application component in a different replicated cluster in case of a failure and returning the pseudo identifier for the similar application component so that packets can be rerouted to an active application component instead of the failed component.

The techniques depicted in FIG. 7 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a controller module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 8:
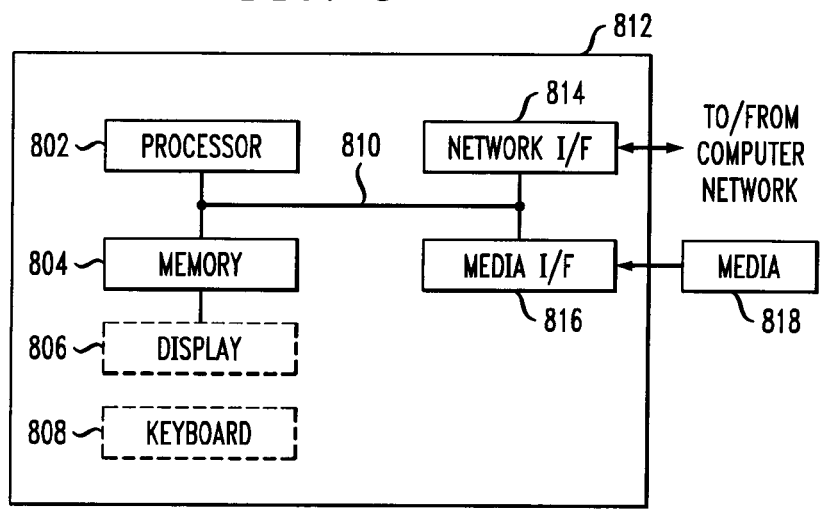
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, enabling co-existence of hosts or virtual machines with identical layer 2 and layer 3 addresses to co-exist in a single data center network and allow east-west communication between peers that belong to the same replicated cluster, east-west communication with peers in the host network as well as north-south communication with external clients.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling co-existence of multiple machines with identical addresses within a single data center network, wherein the method comprises:
    assigning a unique machine pseudo identifier to each machine in the network that can be used for routing a packet to a destination machine;
    replacing a sender media access control address on an address resolution protocol request with a sender pseudo identifier of the sender at an edge network switch;
    determining a replica identifier from the sender pseudo identifier;
    retrieving a private network identifier from a mapping table based on the sender pseudo identifier and returning a destination pseudo identifier for the destination address based on at least one of the private network identifier and the replica identifier; and
    replacing the destination pseudo identifier of the destination address with an actual identifier at a destination edge network switch for routing the packet to the destination machine;
    wherein at least one step is carried out by a computer device.

2. The method of claim 1, wherein the multiple machines comprise at least one of multiple hosts and multiple virtual machines.

3. The method of claim 1, wherein routing is done based on pseudo identifiers.

4. The method of claim 1, wherein replacing a sender media access control address on an address resolution protocol request with a sender pseudo identifier of the sender comprises replacing the address via use of a top-of-rack (TOR) switch.

5. The method of claim 1, wherein replacing a sender media access control address on an address resolution protocol request with a sender pseudo identifier of the sender comprises replacing the address via use of a virtual switch.

6. The method of claim 1, further comprising redirecting the address resolution protocol request to a network controller.

7. The method of claim 1, wherein retrieving a private network identifier from a mapping table based on the sender pseudo identifier comprises retrieving the private network identifier via use of a network controller.

8. The method of claim 1, wherein returning a destination pseudo identifier for the destination address comprises returning a destination pseudo identifier for the destination address for which media access control address is being requested.

9. The method of claim 1, wherein replacing the destination pseudo identifier of the destination address with an actual identifier comprises replacing the identifier via use of a destination top-of-rack (TOR) switch.

10. The method of claim 1, wherein replacing the destination pseudo identifier of the destination address with an actual identifier comprises replacing the identifier via use of a virtual switch.

11. The method of claim 1, wherein assigning a unique machine pseudo identifier to each machine in the network comprises assigning a unique machine pseudo identifier to each machine that embeds one of a data center identifier, a pod identifier, a switch identifier, a port number, a virtual machine identifier, a replication identifier and an application identifier.

12. The method of claim 1, wherein determining a replica identifier from the sender pseudo identifier comprises determining the replica identifier via a controller.

13. The method of claim 1, wherein returning a destination pseudo identifier for the destination address comprises returning the destination pseudo identifier for the destination address for which media access control address is being requested.

14. The method of claim 11, further comprising using an application identifier in the pseudo identifier to match a similar application component in a replicated cluster in case of a failure and returning the pseudo identifier for the similar application component so that packets can be rerouted to an active application component instead of the failed component.

* * * * *